United States Patent Office 3,291,796
Patented Dec. 13, 1966

3,291,796
PESTICIDAL POLY-SUBSTITUTED DIALKOXY ANILINO TRIAZINES
Frank Ross, Villa Park, and Sidney B. Richter, Chicago, Ill., assignors to Velsicol Chemical Corporation, Chicago, Ill., a corporation of Illinois
No Drawing. Filed Sept. 15, 1964, Ser. No. 396,720
9 Claims. (Cl. 260—249.5)

This is a continuation-in-part application of application Serial No. 238,282, filed November 16, 1962, now abandoned.

This invention relates to new pesticidal compositions of matter. More particularly, this invention relates to compounds having the structural formula

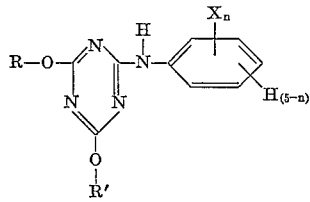

wherein R and R' are independently selected from the group consisting of alkyl and alkoxy substituted alkyl radicals of 1 to 4 carbon atoms, $n$ is an integer from 2 to 5, and each X is independently selected from the group consisting of chlorine, bromine, nitro, amino, and alkyl, alkoxy, acyl and alkylamido radicals of 1 to 4 carbon atoms, provided a maximum of two X's are nitro radicals, and provided that a minimum of one X is selected from the group consisting of chlorine, bromine, nitro, amino, and alkoxy, acyl and alkylamido radicals of 1 to 4 carbon atoms.

Generally, the new compounds described above can be prepared, for example, by replacing the halogen atoms of the corresponding cyanuric halide with the desired substituents. Cyanuric halides which are suitable as the starting material for the preparation of the compounds of this invention, are cyanuric chloride and cyanuric bromide.

As one example of the method of preparation of the compounds of this invention, in the first step, the cyanuric halide is reacted with a suitable substituted aniline to form the intermediate, 2-(substituted anilino)-4,6-dihalo-1,3,5-triazine. Suitable substituted aniline reactants useful in the formation of the intermediates of the compounds of this invention are anilines of the formula

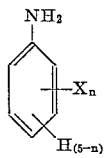

wherein $n$ is an integer from 2 to 5, and each X is independently selected from the group consisting of chlorine, bromine, nitro, and alkyl, alkoxy, acyl and alkylamido radicals of 1 to 4 carbon atoms, provided a maximum of two X's are nitro radicals, and provided that a minimum of one X is selected from the group consisting of chlorine, bromine, nitro, amino, and alkoxy, acyl and alkylamido radicals of 1 to 4 carbon atoms. The aniline reactant selected determines the anilino substituent of the new compound of this invention. For example, if the desired compound is to have a dichloroanilino substituent in the 2-position, then dichloroaniline is selected as the substituted aniline, represented by the above structural formula wherein $n$ is 2 and both X's are chlorine.

Illustrative of other aniline reactants are: 2,5-dibromoaniline, 2-methoxy-5-methyl-aniline, 3-amino-4-methoxyacetophenone, 2,4 - dimethoxy - 5 - nitroaniline, 3,4,5-trichloroaniline, 2-amino-3,5-dibromo - N - ethylbenzamide, and the like.

The 2-substituted anilino-4,6-dihalo-1,3,5-triazine intermediate can be readily prepared by reacting cyanuric chloride or cyanuric bromide with an equimolecular or greater quantity of the substituted aniline reactant in the presence of an equimolecular or greater quantity of a base, such as sodium hydroxide or potassium hydroxide. The base neutralizes hydrogen chloride as it is formed, forcing the reaction to proceed. Cyanuric halide is preferably dissolved in an organic solvent, such as acetone or dioxane. The reaction is preferably performed in an aqueous cooled system, so as to replace only one halogen atom of the cyanuric halide. The crude intermediate thus formed can often be used in the next step as such, after separation from the reaction mixture, or can be recrystallized from a suitable solvent to yield relatively pure intermediate.

In the second step the intermediate is reacted with a suitable alkanol or alkanols to form the desired product. Suitable alkanol reactants useful in the preparation of the new compounds of this invention, are the alkyl and alkoxy substituted alkyl alcohols having 1 to 4 carbon atoms. The alkoxy residue of the alcohol selected will appear as the alkoxy substituent. Thus, for example, if the desired compound of this invention is to have a methoxy substituent in the 2- or 4-position, methanol would be selected as the alkanol reactant. Similarly, to obtain the ethoxy, n-propoxy, iso-propoxy, n-butoxy, iso-butoxy, sec-butoxy, or tert-butoxy substituent in the 2- or 4-position, ethanol, n-propanol, iso-propyl alcohol, n-butyl alcohol, iso-butyl alcohol, sec-butyl alcohol, and tert-butyl alcohol, respectively, would be utilized as the alkanol reactant.

More particularly, the second step of the preparation is performed by reacting the intermediate of the first step with an equimolecular or greater quantity of alkanol reactant for each halogen atom of the intermediate to be replaced, in the presence of a base such as sodium hydroxide, potassium hydroxide, or the like. The reaction can be performed at higher temperatures, such as about 100° C., or at the reflux temperature of a solvent mixture, to replace two halogen atoms as where R and R' are to be identical. The reaction is conveniently performed in the presence of an equimolecular quantity of a base, such as sodium hydroxide or potassium hydroxide for each halogen atom of the intermediate to be replaced. The base, which can be suspended in the alkanol reactant, neutralizes hydrogen chloride as it is released by the reaction. The crude product will often precipitate from the reaction mixture, or will precipitate upon addition of the reaction mixture to water, and if necessary, with cooling. The crude product thus obtained can often be used as such, or can be recrystallized from a suitable solvent to yield the relatively pure compound.

Alternatively, the cyanuric halide can be reacted with an alkanol or successively with two alkanols to form the intermediate 2,4-dialkoxy-6-halo-1,3,5-triazine, which is then reacted with the substituted aniline. The cyanuric halide can be reacted with one equimolecular quantity of an alkanol at a low temperature to replace only one halogen atom, and then with an equimolecular quantity of a second alkanol at a higher temperature to form the dialkoxy intermediate wherein R and R' are non-identical; or the cyanuric halide can be reacted with twice the equimolecular quantity of one alkanol at the higher temperature to replace two halogen atoms to form the dialkoxy intermediate wherein R and R' are identical. The reaction of the dialkoxy intermediate with the suitably substituted aniline takes place at a still higher temperature such as 100° C., or, preferably, at the reflux temperature of a mixture of the reactants with an inert solvent boiling at about 100° C. such as water or dioxane. The reactions proceed in the presence of base in the same manner as the previously described method. This alternative method of preparation is preferred where R and R' are non-identical.

The compounds of the present invention represented by the structure heretofore described, wherein each X is independently selected from the group consisting of chlorine, bromine, nitro, and alkyl, alkoxy, acyl and alkylamido radicals of 1 to 4 carbon atoms and at least one X is chlorine, bromine, nitro, alkoxy, acyl or alkylamido, can be readily prepraed by the aforementioned procedures. Compounds of the present invention wherein at least one X is amino are preferably prepared from the corresponding compound wherein the said X is a nitro radical. It has been found more convenient to reduce the compound containing the nitro radical by means common to the art to an amino radical, than to attempt to utilize an amino-substituted aniline reactant in the previously described preparation. The reduction of the nitro radical to an amino radical can be conveniently carried out by nascent hydrogen supplied by the action of tin on hydrochloric acid in the manner common to the art.

While all the compounds described herein are novel and useful, compounds having the structure heretofore described, wherein R and R' are both methyl, $n$ is an integer from 2 to 3, and each X is independently selected from the group consisting of chlorine, bromine, nitro, acetyl, and alkyl and alkoxy radicals of 1 to 4 carbon atoms, provided a maximum of two X's are nitro radicals, and provided that a minimum of one X is selected from the group consisting of chlorine, bromine, nitro, and acetyl and alkoxy radicals of 1 to 4 carbon atoms, are perferred and constitute preferred embodiments of the present invention due to their economical and facile preparation.

The manner in which the new compounds of this invention can be prepared is illustrated in the following examples. Although cyanuric chloride is used as the starting material in these examples, it is understood that cyanuric bromide can be substituted therefor.

*Example 1.—Preparation of 2-(2-methyl-5-chloroanilino)-4,6-dimethoxy-1,3,5-triazine*

A solution of cyanuric chloride (55.5 g.; 0.3 mol) in acetone (300 ml.) was added to a stirred mixture of ice (600 g.) and water (150 ml.) in a 2-liter, three-necked, round-bottom flask equipped with mechanical stirrer, internal thermometer, and dropping funnel. 2-methyl-5-chloroaniline (42.5 g.; 0.3 mol) in acetone (300 ml.) was added dropwise with stirring over a 70 minute period. A solution of sodium hydroxide (12 g.; 0.3 mol) in water (200 ml.) was added dropwise over one-half hour. Agitation was continued for two hours. The intermediate product 2-(2-methyl-5-chloroanilino)-4,6-dichloro-1,3,5-triazine, was separated from solution by filtration, washed with water (1 liter), and dried.

The intermediate obtained above was added in small increments to a suspension of sodium hydroxide (24 g.; 0.6 mol) in methanol (500 ml.). The resulting mixture was heated with stirring at reflux for 2 hours, and then poured into water (1 liter) to yield the crude product as a precipitate. The crude product was filtered in vacuo, dried, recrystallized several times from methanol and dried at 100° C. over calcium chloride and paraffin to yield purified 2-(2-methyl-5-chloroanilino)-4,6-dimethoxy-1,3,5-triazine as a white solid melting 126–7° C. and having the following elemental analysis—

Calculated for $C_{12}H_{13}ClN_4O_2$, theoretical, percent: C, 51.34; H, 4.56; N, 19.96; Cl, 12.63. Found, percent: C, 51.23; H, 4.66; N, 19.98; Cl, 12.66.

*Example 2.—Preparation of 2-(2,5-dibromoanilino)-4,6-dimethoxy-1,3,5-triazine*

A solution of cyanuric chloride (9.3 g.; 0.05 mol) in acetone (50 ml.) was added with stirring to ice (104.2 g) in a 500 ml., three-necked, round-bottom flask equipped with mechanical stirrer, internal thermometer, and dropping funnel, and cooled in an ice bath. 2,5-dibromoaniline (12.5 g.; 0.05 mol) in acetone (50 ml.) was added dropwise to the flask over a period of 15 minutes, while the contents were cooled. A solution of sodium hydroxide (2 g.; 0.05 mol) in water (50 ml.) was added dropwise over a 15 minute period. Stirring was continued for two hours. The reaction mixture was poured into cold water (500 ml.) to precipitate the intermediate 2-(2,5-dibromoanilino)-4,6-dichloro-1,3,5-triazine, which was filtered, washed with cold water, and dried.

The intermediate obtained above was stirred at reflux with a solution of potassium hydroxide (5.6 g.) in methanol (200 ml.) for two hours. The reaction mixture was poured into water (500 ml.) to yield the crude product as a precipitate. The crude product was filtered in vacuo, washed with cold water, dried, recrystallized several times from dioxane and water, and then dried to yield purified 2-(2,5-dibromoanilino) - 4,6-dimethoxy - 1,3,5-triazine as a white solid melting 147° C., and having the following elemental analysis—

Calculated for $C_{11}H_{10}Br_2N_4O_2$, theoretical, percent: C, 33.87; H, 2.58; N, 14.37; Br, 40.98. Found, percent: C, 34.12; H, 2.86; N, 13.98; Br, 40.86.

*Example 3.—Preparation of 2-(3,5-dichloroanilino)-4,6-dimethoxy-1,3,5-triazine*

A solution of cyanuric chloride (18.5 g.; 0.1 mol) in acetone (50 ml.) was added to ice (205.6 g.) in a 1-liter, three-necked, round-bottom flask equipped with mechanical stirrer, internal thermometer, and dropping funnel, and cooled in an ice bath. 3,5-dichloroaniline (162 g.; 0.1 mol) in acetone (100 ml.) was added dropwise to the flask over a period of 15 minutes. A solution of sodium hydroxide (4 g.; 0.1 mol) in water (100 ml.) was added to the flask dropwise over a 15 minute period, and stirring was continued for two hours. The intermediate, 2-(3,5-dichloroanilino)-4,6-dichloro-1,3,5-triazine, precipitated from solution, and was filtered, washed with cold water and dried.

The intermediate thus obtained was heated for two hours at reflux with a solution of potassium hydroxide (11.2 g.; 0.2 mol) in methanol (200 ml.). The mixture was poured into water (500 ml.) and cooled to precipitate the crude product, which was filtered, washed with cold water, recrystallized from dioxane-water, methanol and then dioxane, and dried at 100° C. over calcium chloride and paraffin to yield purified 2-(3,5-dichloroanilino)-4,6-dimethoxy-1,3,5-triazine as a white solid melting 253° C., and having the following elemental analysis—

Calculated for $C_{11}H_{10}Cl_2N_4O_2$, theoretical, percent: C, 43.87; H, 3.35; N, 18.61; Cl, 23.55. Found, percent: C, 44.05; H, 3.71; N, 18.72; Cl, 23.63.

*Example 4.—Preparation of 2-(2-methoxy-5-acetylanilino)-4,6-dimethoxy-1,3,5-triazine*

A solution of cyanuric chloride (11.1 g.; 0.06 mol) in acetone (60 ml.) was added with stirring to a mixture of ice (105.6 g.) and water (30 ml.) in a 500 ml. three-necked, round-bottom flask equipped with mechanical stirrer, internal thermometer and dropping funnel, and cooled in an ice bath. A solution of 3-amino-4-methoxy-acetophenone (10 g.; 0.06 mol) in acetone (200 ml.) was added dropwise to the flask with stirring, over a period of 15 minutes. Sodium hydroxide (2.4 g.; 0.06 mol) dissolved in water (50 ml.) was added to the stirred reaction mixture over a period of 15 minutes. Stirring of the contents of the flask was continued for two hours. The intermediate, 2-(2-methoxy-5-acetylanilino)-4,6-dichloro- 1,3,5-triazine, precipitated from solution and was separated therefrom by filtration, washed with cold water and dried.

The intermediate prepared above was stirred and heated at reflux with a solution of potassium hydroxide (7 g.; 0.125 mol) in methanol (200 ml.). Heating was continued for two hours. The reaction mixture was poured into water (1 liter) to precipitate the crude product, which was separated from the aqueous solution by filtration, washed with water, recrystallized several times from methanol and dried at 100° C. over calcium chloride and paraffin to yield purified 2-(2-methoxy-5-acetylanilino)-4,6-dimethoxy-1,3,5-triazine, as a white solid melting 184° C. and having the following elemental analysis—

Calculated for $C_{14}H_{16}N_4O_4$, theoretical, percent: C, 55.25; H, 5.30; N, 18.41. Found, percent: C, 55.39; H, 5.70; N, 18.48.

*Example 5.—Preparation of 2-(2,4-dimethyl-5-nitroanilino)-4,6-dimethoxy-1,3,5-triazine*

A solution of cyanuric chloride (18.5 g.; 0.1 mol) in dioxane (100 ml.) was added with stirring to ice (205 g.) in a 1-liter, three-necked round-bottom flask equipped with mechanical stirrer, internal thermometer, and dropping funnel, and cooled in an ice bath. A solution of 2,4-dimethyl-5-nitroaniline (16.2 g.; 0.1 mol) in dioxane (100 ml.) and acetone (50 ml.) was added rapidly to the flask with stirring of the contents. Sodium hydroxide (4 g.; 0.1 mol) dissolved in water (100 ml.) was added dropwise to the flask. Stirring of the contents of the flask was continued for two hours. The intermediate, 2-(2,4-dimethyl-5-nitroanilino) - 4,6-dichloro - 1,3,5 - triazine, precipitated from solution and was separated therefrom by filtration, washed with cold water, and dried.

The intermediate prepared above was mixed with a solution of potassium hydroxide (11.2 g.; 0.2 mol) in methanol (200 ml.), stirred and heated for two hours at reflux temperature. The solution was then diluted with water (500 ml.) and the crude product which precipitated was separated by filtration, washed with cold water, recrystallized once from dioxane-water and twice from methanol, and dried at 100° C. over calcium chloride and paraffin to yield purified 2-(2,4-dimethyl-5-nitroanilino)-4,6-dimethoxy-1,3,5-triazine, as a yellow solid melting 160.5–161.5° C. and having the following elemental analysis—

Calculated for $C_{13}H_{13}N_5O_4$, theoretical, percent: C, 51.14; H, 4.95; N, 22.94. Found, percent: C, 50.67; H, 5.08; N, 23.08.

*Example 6.—Preparation of 2-(2-methyl-5-chloroanilino)-4-methoxy-6-ethoxy-1,3,5-triazine*

A solution of cyanuric chloride (185 g.; 1 mol) in methanol (1.2 liters) was placed into a 2-liter, three-necked, round-bottom flask equipped with mechanical stirrer, thermometer, and ice-water cooling bath. 2,4,6-trimethylpyridine (121.2 g.; 1 mol) was slowly added to the flask, while the contents of the flask were stirred. Although the reaction temperature initially rose to 35° C., it was thereafter maintained at 5°–10° C. The mixture was stirred for 2½ hours. The reaction solution was then diluted with water (3 liters) and the resulting yellow crystals of 2-methoxy-4,6-dichloro-1,3,5-triazine were separated therefrom by filtration, washer with water and dried by standing.

Sodium carbonate (84 g.; 1 mol) and 2-methoxy-4,6-dichloro-1,3,5-triazine (180 g.; 1 mol) prepared as described above are added to ethanol (800 ml.) and water (100 ml.) in the flask described above fitted with a heating mantle in place of the cooling bath. The mixture is stirred for ½ hour at 35° C. and then heated to reflux for ½ hour. Upon completion of the reaction the evolution of carbon dioxide gas diminishes. The reaction mixture is poured onto ice (about 100 g.) and the precipitate separated by filtration, washed with water (1.5 liters), filtered in vacuo, and dried over sulfuric acid in a vacuum desiccator. The dried solid is dissolved in hot benzene and filtered, and the filtrate diluted with heptane and cooled to precipitate the intermediate 2-methoxy-4-ethoxy-6-chloro-1,3,5-triazine.

2-methoxy-4-ethoxy-6-chloro-1,3,5-triazine (47.4 g.; 0.25 mol) prepared as described above dissolved in dioxane (300 ml.) is added to water (500 ml.) in the flask described above. 2-Methyl-5-chloroaniline (35.4 g.; 0.25 mol) dissolved in dioxane (200 ml.) is slowly added to the flask. Sodium hydroxide (10 g.; 0.25 mol) dissolved in water (180 ml.) is added in small increments to the contents of the flask, which are then heated at reflux with stirring for several hours. The reaction mixture is poured into water (1 liter) to yield the crude product as a precipitate, which is filtered, recrystallized several times from a suitable solvent, such as methanol, and dried to yield purified 2 - (2 - methyl - 5 - chloroanilino)-4-methoxy-6-ethoxy-1,3,5-triazine.

*Example 7.—Preparation of 2-(2,5-dichloroanilino)-4,6-di-(β-methoxyethoxy)-1,3,5-triazine*

2-(2,5-dichloroanilino)-4,6-dichloro-1,3,5 - triazine (19 g.; 0.06 mol), prepared by the reaction of 2,5-dichloroaniline and cyanuric chloride in the manner described in Example 1, was heated at reflux for one hour with a solution of potassium hydroxide (6.7 g.; 0.12 mol) in ethylene glycol monomethyl ether (100 ml.). The solution was diluted with water (300 ml.) and cooled in an ice water bath. An oil precipitated from solution solidified on standing, and was recrystallized several times from methanol-water mixture to yield the solid product 2-(2,5-dichloroanilino)-4,6-di-(β-methoxyethoxy) - 1,3,5 - triazine, melting 100–101° C., and having the following elemental analysis—

Calculated for: $C_{15}H_{18}Cl_2N_4O_4$, theoretical, percent: C, 46.28; H, 4.66; N, 14.40. Mound, percent: C, 46.30; H, 4.84; N, 14.65.

Other compounds within the scope of the present invention having the aforesaid structural formula can be prepared in the manner detailed in the previous examples. Given in Examples 8–19 are the reactants which can be used with cyanuric chloride and cyanuric bromide to prepare the indicated named compounds of this invention. In several of these examples, the melting point of the purified product is presented after the name of the compound. In these examples, cyanuric chloride is designated for brevity as CC. It is also noted that cyanuric bromide can be utilized in place of cyanuric chloride to obtain the same compound.

*Example 8*

CC+2-methoxy - 5 - methylaniline+methanol=2-(2-methoxy-5-methylanilino)-4,6-dimethoxy-1,3,5 - triazine, 130–1° C.

*Example 9*

CC+2-methoxy - 5 - chloroaniline+methanol=2-(2-methoxy-5-chloroanilino)-4,6-dimethoxy-1,3,5 - triazine, 162–3° C.

*Example 10*

CC+3,4 - dichloroaniline+methanol=2-(3,4-dichloroaniline)-4,6-dimethoxy-1,3,5-triazine, 205.5° C.

*Example 11*

CC+2,4-dimethoxy - 5 - chloroaniline+methanol=2-(2-4-dimethoxy - 5 - chloroanilino)-4,6-dimethoxy-1,3,5-triazine, 171–2° C.

*Example 12*

CC+2,5-dimethoxy - 4 - chloroaniline+methanol=2-(2,5-dimethoxy - 4 - chloroanilino)-4,6-dimethoxy-1,3,5-triazine, 173–4° C.

Example 13

CC+3,4,5 - trimethoxyaniline+methanol=2 - (3,4,5 imethoxyanilino)-4,6-dimethovy-1,3,5 - triazine, 128–90

Example 14

CC+2,4,5 - trichloroaniline+methanol=2 - (2,4,5-ichloroanilino)-4,6-dimethoxy-1,3,5-triazine, 181–2° C.

Example 15

CC+2-amino - 3,5 - dibromo - N - ethylbenzamide+ ιethanol=2-(2-(N-ethylamido) - 4,6 - dibromoanilino)-,6-dimethoxy-1,3,5-triazine.

Example 16

CC+methanol+iso - propanol+3,5-di-chloroaniline= - (3,5-dichloroanilino)-4-methoxy-6-iso-propoxy - 1,3,5-iazine.

Example 17

CC+2,3,4,6 - tetrachloroaniline+methanol=2-(2,3,4,6-trachloroanilino)-4,6-dimethoxy-1,3,5-triazine.

Example 18

CC + 2,3,4,5,6 - pentachloroaniline + methanol=2-2,3,4,5,6-pentachloroanilino) - 4,6 - dimethoxy - 1,3,5-iazine.

Example 19

CC+2,4,5 - trichloroaniline+n - butanol=2 - (2,4,5-ichloroanilino)-4,6-di-n-butoxy-1,3,5-triazine.

The following example is illustrative of the preparation f the compounds of the present invention wherein at least ne X is an amino radical. Although a specific 2-(nitronilino)-4,6-dialkoxy-1,3,5-triazine is utilized in the example, it is noted that any other compound of this invention wherein at least one X is a nitro radical may be ıbstituted in its place to obtain the corresponding aminoıbstituted compound.

Example 20.—Preparation of 2-(2,4-dimethyl-5-aminoanilino)-4,6-dimethoxy-1,3,5-triazine An excess of iron filings is slowly added to the product f Example 5 (40 g.) suspended in hot water (400 ml.) cidified with concentrated hydrochloric acid (5 ml.). 'he mixture is shaken continually during the addition and old water is added to the mixture, as required, to modrate the reaction temperature. When heat no longer volves, the mixture is gently heated and sodium carboıate (10 g.) is added. The mixture is filtered while hot nd the filtrate cooled and extracted with anhydrous liethyl ether. The ether extract is dried over anhydrous nagnesium sulfate, which is then removed by distillation n vacuo on a steam bath to yield the desired product as he residue.

For practical use as insecticides, the compounds of this nvention are generally incorporated into insecticidal comıositions which comprise a major proportion of an inert arrier and an insecticidally toxic amount of such a comıound. Such insecticidal compositions, which are usually ınown in the art as formulations, enable the active comıound to be applied conveniently to the site of the insect nfestation in any desired quantity. These compositions an be solids such as dusts, granules, or wettable powders; ιr they can be liquids such as solutions or emulsifiable ıoncentrates.

For example, dusts can be prepared by grinding and ılending the active compound with a solid inert carrier uch as the talcs, clays, silicas, pyrophyllite, and the like. Jranular formulations can be prepared by impregnating he compound, usually dissolved in a suitable solvent, on o and into granulated carriers such as the attaplugites or he vermiculities, usually of a particle size range of from ıbout 0.3 to 1.5 mm. Wettable powders, which can be lispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

Example 21.—Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect infestation.

The insecticides of this invention can be applied in any manner recognized by the art. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides spreaders, adhesives, stickers, fertilizers, activators, synergists, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include bores such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

*Example 22*

The utility of the compounds of this invention was illustrated for example, by experiments carried out for the control of spider mites.

In a typical experiment, samples of the compound to be tested were formulated as follows:

Samples were each dissolved in a solution of benzene (1 ml.), acetone (1 ml.) and alkyl aryl polyether alcohol type surface active agent (0.5 ml.) and dispersed in distilled water to a concentration of 0.35% by weight test compound per volume of solution.

Samples were also each dissolved in a solution of benzene (0.5 ml.), acetone (0.5 ml.) and alkyl aryl polyether alcohol type surface active agent (0.5 ml.) and dispersed in distilled water to a concentration and 0.1% by weight test compound per volume of solution. Control solutions were prepared by dispersing the solvents and surface active agent in water.

Potted lima bean plants were infested with fifty to one hundred adults of the strawberry spider mite, *Tetranychus atlanticus,* prior to testing. The infested plants were dipped into the test solution and held under greenhouse conditions. Five days after application, the plants were observed for adult mite mortality.

The results of these experiments are presented in the table below:

TABLE I

| Test Compound | Conc., Percent Compound/ volume soln. | Percent Mortality after 5 days |
|---|---|---|
| Product of Example 1 | 0.35 | 100 |
| Product of Example 1 | 0.1 | 90 |
| Control | | 0 |

We claim:
1. A compound of the formula

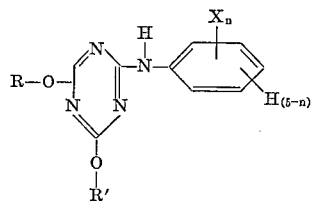

wherein R and R' are independently selected from the group consisting of alkyl and alkoxy substituted alkyl radicals of 1 to 4 carbon atoms; $n$ is an integer from 2 to 5; and each X is independently selected from the group consisting of chlorine, bromine, nitro, amino, and alkyl, alkoxy, acyl and alkylamido radicals of 1 to 4 carbon atoms, provided a maximum of two X's are nitro radicals, and provided that a minimum of one X is selected from the group consisting of chlorine, bromine, nitro, amino, and alkoxy, acyl and alkylamido radicals of 1 to 4 carbon atoms.

2. 2-(2-methyl-5-chloroanilino) - 4,6-dimethoxy-1,3,5-triazine.
3. 2-(2-methyl-5-chloroanilino) - 4-methoxy-6-ethoxy-1,3,5-triazine.
4. 2-(3,4-dichloroanilino)-4,6-dimethoxy-1,3,5-triazine.
5. 2-(3,5-dichloroanilino)-4,6-dimethoxy-1,3,5-triazine.
6. 2-(2-methoxy-5-acetylanilino)-4,6-dimethoxy-1,3,5-triazine.
7. 2-(2,4-dimethyl-5-nitroanilino)-4,6-dimethoxy-1,3,5-triazine.
8. 2-(2,4,5-trichloroanilino) - 4,6-dimethoxy-1,3,5-triazine.
9. 2-(3,4,5-trimethoxyanilino) - 4,6-dimethoxy-1,3,5-triazine.

References Cited by the Examiner
UNITED STATES PATENTS 2,508,323   5/1950   Adams _____ 260—249.5
2,513,264   6/1950   Holm-Hansen _____ 260—249.5
3,205,193   9/1965   Dexter et al. _____ 260—249.5

OTHER REFERENCES

Dudley et al., J. Am. Chem. Soc., volume 73, pages 2986 to 2990 (1951).

WALTER A. MODANCE, *Primary Examiner.*

JOHN M. FORD, *Assistant Examiner.*